United States Patent

Robbins et al.

[11] 4,195,226
[45] Mar. 25, 1980

[54] LUMINESCENT MATERIAL AND PREPARATION AND USE THEREOF

[75] Inventors: David J. Robbins, Malvern, England; Dieter H. Bimberg, Grenoble, France

[73] Assignee: Max-Planck-Gesellschaft zur Förderung der Wissenschaften e.V., Munich, Fed. Rep. of Germany

[21] Appl. No.: 937,419

[22] Filed: Aug. 28, 1978

Related U.S. Application Data

[60] Division of Ser. No. 742,539, Nov. 17, 1976, which is a continuation-in-part of Ser. No. 664,975, Mar. 8, 1976, abandoned, and a continuation-in-part of Ser. No. 664,976, Mar. 8, 1976, abandoned.

[30] Foreign Application Priority Data

Mar. 7, 1975 [GB] United Kingdom ............... 9664/75
Mar. 7, 1975 [GB] United Kingdom ............... 9665/75

[51] Int. Cl.² .................. G01T 1/20; H01J 31/50; C09K 11/08; G01N 21/38
[52] U.S. Cl. ..................... 250/363 R; 250/330; 250/483; 252/301.4 P
[58] Field of Search .............. 250/361 R, 483, 363 R, 250/330; 252/301.4 P

[56] References Cited

U.S. PATENT DOCUMENTS 3,813,613  5/1974  Danielmeyer et al. ........ 252/301.4 P
3,863,177  1/1975  Damen et al. ................ 252/301.4 P

OTHER PUBLICATIONS

Hewes, "Efficient Infrared Excited Visible Luminescence in Rare Earth Systems," Conf. IEEE, Mar. 22-26, 1970, IEEE International Convention Digest, New York, pp. 70-71.

*Primary Examiner*—Alfred E. Smith
*Assistant Examiner*—Carolyn E. Fields
*Attorney, Agent, or Firm*—Toren, McGeady and Stanger

[57] ABSTRACT

Pentaphosphates of the formula $XP_5O_{14}$, wherein X is a rare earth metal, respond to incident ionizing radiation by emitting secondary electromagnetic radiation which may be visible or may be made visible by doping with other rare earth metal pentaphosphates or mixtures of Mn and Sb ions. The pentaphosphates of Ce and Pr respond quickly to cessation of incident radiation so that they are used to advantage in scintillators.

7 Claims, 5 Drawing Figures

LUMINESCENT MATERIAL AND PREPARATION AND USE THEREOF

This is a division of application Ser. No. 742,539, filed Nov. 17, 1976, which is a continuation-in-part of our copending applications Ser. Nos. 664,975 and 664,976, both filed on Mar. 8, 1976, and now abandoned.

This invention relates to luminescence, and particularly to luminescent materials, a method of preparing the same, and to their use.

Fluorescent and phosphorescent materials emit electromagnetic radiation when exposed to excitation, for example, by a ray of electrons or suitable particulate matter, to an applied electric field, or to electromagnetic radiation of high energy. The radiation originates usually from luminescent or active ionic sites within a solid matrix or lattice. Phosphors capable of emitting visible light are especially useful in indicating and display instruments, such as cathode ray tubes, wherein the emitted light produces visible information, in luminescent tubes, such as fluorescent tubes, in scanning electron microscopes, scintillation counters, radiation indicating devices, in apparatus for medical and dental X-ray topography, and the like.

Organic and inorganic fluorescent materials were known heretofore. Inorganic materials are generally preferred because of their higher resistance to particulate radiation. The known inorganic luminescent materials consist generally of fine-grained powders, such as those of zinc orthosilicate doped with manganese ions, and the grain size of the known powders is of the order of several micrometers. The grain size limits the resolution of images produced by electromagnetic radiation emitted from the powders. It is an additional disadvantage of the known luminescent materials that the intensity of the emitted light is too low for many applications. Moreover, the light emission from known luminescent materials continues after discontinuance of external excitation for a period which is too long for certain potential applications.

It is an important object of this invention to provide luminescent materials which generate luminous images of better resolution than was available heretofore, and of high light intensity, yet fading quickly after excitation ceases. Another object is the provision of a method for producing such luminescent materials. Yet another object is the provision of fields of application in which the materials of the invention are used to particular advantage.

The luminescent materials of this invention are of the formula $XP_5O_{14}$ and consist of a solid matrix and of a multiplicity of luminescent sites distributed in the matrix, X being a trivalent metal and preferably a rare earth metal or a mixture of rare earth metals.

When X is europium or terbium, the ions of these rare earth metals themselves may constitute the luminescent sites. The strong emitted light of Eu is red, that of Tb green. The ions X, however, may be inert, that is, not emit light in the visible range of wavelength, and the luminescent sites in the matrix may be associated with doping ions as in the event of X being yttrium or praseodymium, and the luminescent sites associated with ions of thulium, erbium, europium, or terbium, or a mixture of manganese and antimony ions as doping ions.

A luminescent material of the above formula wherein X is cerium or praseodymium is particularly advantageous for many applications. The luminescence of these materials ceases very rapidly, within approximately 12 nanoseconds when X is cerium, after cessation of external excitation. The best, comparable, known phosphors require a decay period of about 40 nanoseconds.

It is a further advantage of $CeP_5O_{14}$ that the wavelength of its scintillation radiation is approximately 335 nm, that is, in the ultraviolet portion of the spectrum. This wavelength is closely adjacent the response peak of conventional photocathodes as they are employed in photomultiplier tubes used in conjunction with scintillators.

The signal-to-noise ratio in scintillators is determined by the persistence of emission, that is, by the intensity of light emitted after a certain period, and is normally expressed as a percentage of the original light intensity after a stated period. The light emitted by $CeP_5O_{14}$ after 80 microseconds has an intensity of only 0.3% of the original intensity, a property valuable for many applications.

It is an additional advantage of the luminescent pentaphosphate materials of the invention that the luminescent ions are present in the solid pentaphosphate matrix in high concentrations, such as stoichiometric concentrations. The luminescent materials of the invention do not show "concentration quenching", that is, no reduction in light emission when a certain concentration of active ion sites is exceeded, whereas most known luminescent materials show concentration quenching at low concentrations, usually of a few percent.

The luminescent materials of the invention may be used as single crystals or in the amorphous, glass-like state, and single crystals, glass-like objects, and polycrystalline bodies are readily prepared.

The pentaphosphates of cerium and praseodymium are used to advantage in scanning electron microscopes in which good optical coupling between the scintillator and a light tube connected therewith is desirable. Single crystals are usually preferred for this purpose because it is simpler to connect an electrode to a single crystal without impairing the electrode when the single crystal is treated by vacuum recycling. An electrode connected with a polycrystalline luminescent material is impaired thereby. In other fields of application, such as flying spot scanners, a polycrystalline material is preferred because the luminescent material is better suited for producing a screen of large luminous area when in the polycrystalline state. Most of the luminescent materials available heretofore have never been used in the form of single crystals.

The luminescent materials according to the invention may be prepared in the following manner:

A mixture of approximately 3 g of a suitable oxide of the element X, such as $X_2O_3$, wherein X is as defined above, or of an oxide mixture, with 100 g orthophosphoric acid containing approximately 15% water is charged into a gold or graphite crucible. If X is a metal ion which does not fluoresce in the visible range, an activator, such as manganese and antimony, is added to the contents of the crucible in a suitable amount, for example up to 1.0 g activator per 3 g oxide. The crucible then is placed in an inert reaction tube of silica or the like which is connected to a steam extraction device. The tube is heated to a temperature, preferably about 200° C., at which orthophosphoric acid is converted to polyphosphoric acid according to the equation;

When water is continuously moved from the reaction system, the equilibrium is shifted to the right side of the equation, and the oxide dissolves in the gradually dehydrated orthophosphoric acid. Complete dissolution normally takes several hours. When the oxide is entirely dissolved, the temperature of the reaction tube and of its contents is raised to about 500° to 700° C., the specific optimum temperature depending on the kind of oxide which is to be reacted with the polyphosphoric acid to the pentaphosphate. By way of example, a temperature of about 550° C. is adequate for praseodymium and cerium oxides.

After removal of the steam extraction device, the polyphosphoric acid is poured from the hot tube. The residual crystals of $XP_5O_{14}$ are washed in boiling water and dried. If so desired, selected crystals are ground and/or polished in a known manner. The crystals may also be ground to a powder which may be compressed to produce shaped bodies. When the polyphosphoric acid is permitted to cool without separation from the crystals, an amorphous, glass-like body is obtained.

Specific embodiments of the invention will be described with reference to the drawing in which.

Figure 1:
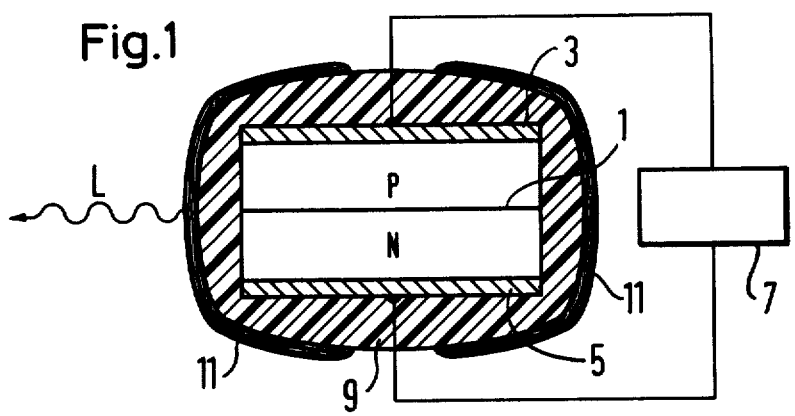
FIG. 1 illustrates a light-emitting diode according to the invention in section.

FIG. 1 shows a gallium arsenide, single crystal disc having two portions P, N doped conventionally to constitute a p-n junction 1. The portions P, N are connected to respective metal contacts 3, 5. The two terminals of a source of voltage 7, including a non-illustrated switch, are connected to the contacts 3, 5. The p-n junction and the metal contacts 3, 5 are encapsulated in a pellet 9 of epoxy resin. The resin surface carries a layer 11 of luminescent material of the invention.

The device shown in FIG. 1 operates as follows:

The voltage source 7 biases the p-n junction and causes emission of infrared radiation by recombination of electrons and holes at the junction. The infrared radiation passes through the pellet 9 and hits the luminescent layer 11 where it is absorbed and converted to visible light L. The luminescent coating 11 consists of a solid solution of erbium pentaphosphate in ytterbium pentaphosphate in a weight ratio of about 9:1. The major component absorbs the infrared radiation, and the absorbed energy is transmitted to the minor component which emits visible light. As little as 1% of the minor component is effective, and its share of the coating may be increased to 20%. The coating is prepared by comminuting the dual pentaphosphate, dispersing the powder so obtained in a conventional lacquer vehicle, such as a solution of nitrocellulose in butyl acetate sufficient to produce a fluid paste, which is applied to the pellet 9 and forms the coating after evaporation of the solvent.

Figure 2:
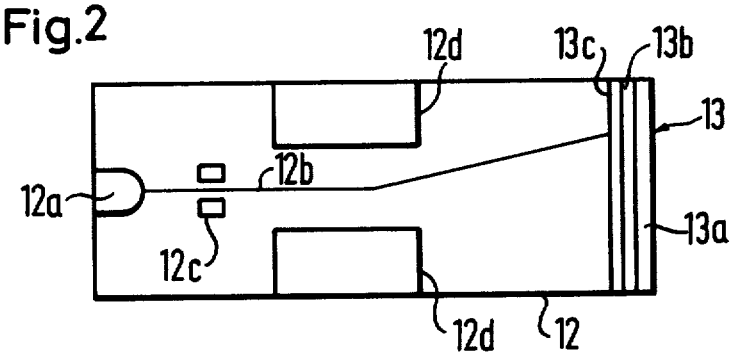
FIG. 2 shows a cathode ray tube scintillator according to the invention in a conventional manner.

In the cathode ray tube 12 shown in FIG. 2, the fluorescent screen 13 has a glass base layer 13a whose inner surface is covered by a luminescent material 13b of the invention which in turn is coated with an aluminum oxide layer 13c. The luminescent material may be applied from a nitrocellulose lacquer as described with reference to FIG. 1. The cathode ray tube is otherwise conventional. Its electrode 12a produces an electron beam 12b which is accelerated by an anode 12c, focused and deflected toward the screen 13 by known devices 12d to produce luminescence in the screen 13.

Figure 3:
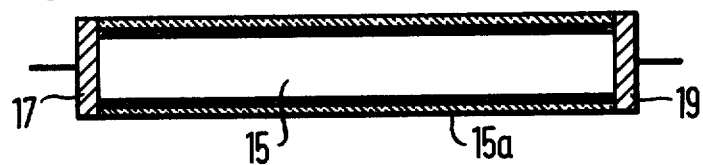
FIG. 3 illustrates a gas discharge tube of the invention in elevational section on its axis.

The gas discharge tube 15 illustrated in FIG. 3 has two electrodes 17, 19 which seal respective axial ends of the tube 15. The tube was evacuated before being sealed and filled with an inert gas at an absolute pressure of a few millimeters mercury. Its inner axial surface is coated with a luminescent material of the invention such as $TbP_5O_{14}$ or $EuP_5O_{14}$. When the two terminals of an alternating current source of about 100 V are connected to the electrodes 17, 19, the resulting electrical discharge in the tube 15 causes ions, low-energy electrons, and electromagnetic radiation, such as ultraviolet rays, to be emitted by the inert gas. The luminescent material 15a absorbs such energy, and itself emits visible light. The tube 15 thus appears as a colored rod to the viewer. If the ingredients of the luminescent materials are suitably mixed, white light may be emitted.

The luminescent layer 15a may be applied by dipping the glass tube 15 in a suspension of luminescent particles in a liquid medium, such as a lacquer vehicle. After evaporation of the solvent from the medium, the coating formed on the outer face of the tube 15 is washed off, the tube then is dried and ready for evacuation and other processing.

An indicator device including a multiplicity of miniature gas discharge tubes arranged in a dot matrix pattern may be provided with pentaphosphate materials of the invention in an analogous manner to produce light emission of a desired color. When the inert gas in the tube adds a color component of its own to the emitted light, such as the orange color produced by neon, the pentaphosphate materials have to be selected to compensate for this emission when white light is desired.

Figure 4:
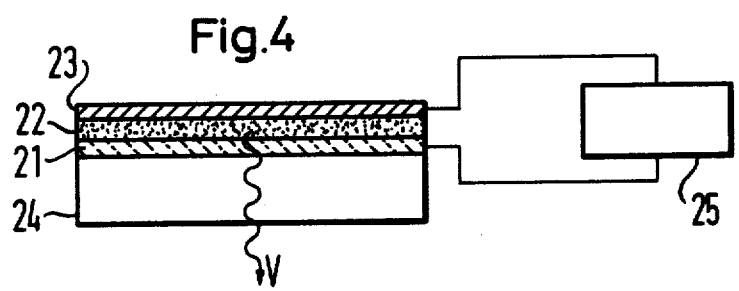
FIG. 4 shows an electroluminescent device of the invention in a conventional manner.

The electroluminescent device shown in FIG. 4 has a transparent, conductive layer 21 of tin oxide deposited as an electrode on a glass substrate 24. A luminescent pentaphosphate powder of the invention dispersed in a minimum amount of dielectric polyvinyl chloride binder forms a layer 22 over the electrode 21. The free surface of the luminescent layer is covered with an aluminum layer 23 as the other electrode. A voltage source 25, such as a switched outlet for alternating current of a few hundred volts at about 500 to 1000 Hz is connected to the two electrodes, whereby visible light is emitted through the electrode 21 and the glass substrate 24.

One may also mix the luminescent particles with conductive particles, such as copper powder, which are electrically controlled or formed, whereby a narrow, light emitting region is created which may be excited by unidirectional potentials. No dielectric binder is employed in this case.

Figure 5:
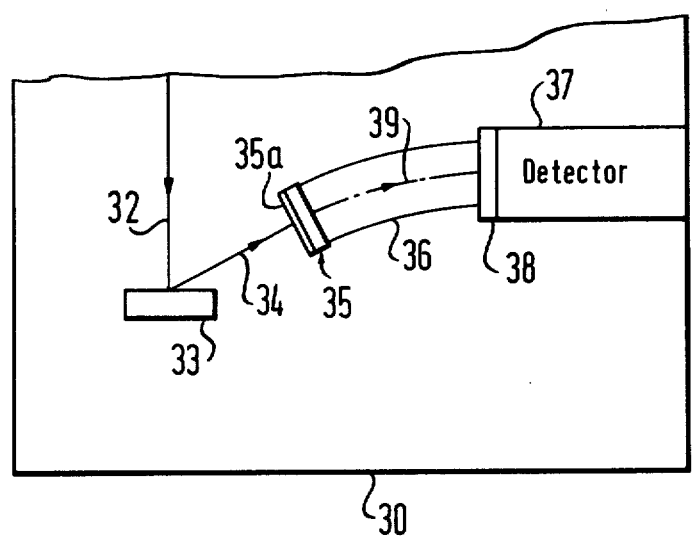
FIG. 5 is a fragmentary, simplified view of a scanning electron microscope of the invention.

The scanning electron microscope 30 only partly illustrated in FIG. 5 produces a primary electron beam 32 which scans the surface of a material 33 to be investigated. Bombardment by the beam 32 causes the material 33 to emit secondary electrons. A portion of the scattered secondary electrons constitutes a beam 34 which impinges on a scintillator 35 consisting of a single crystal of cerium or praseodymium pentaphosphate. The scintillator 35 has an electrode 35a which permits an incident charge to be removed by leakage. The incident beam 34 causes the scintillator to emit a scintillation beam 39 which is led to a detector 37 by a light guiding tube 36 of light conducting fibers. The detector is a photomultiplier having a photocathode 38. A cathode ray tube may be employed to indicate the output of the photomultiplier in synchronization with the scanning of the primary beam 32. An image produced in this manner by the detector reproduces the surface of the material 33.

The pentaphosphates of cerium and praseodymium may be employed alternatively as scintillators in a known flying spot scanner, a known radiation indicating instrument, or a known scintillation counter. The flying spot scanner includes a scintillator of large area which is scanned by an electron beam in a line or in a raster. The scintillator produces corresponding emitted beams which may be received on an indicating surface. The emitted beams are transmitted to selected areas of the surface, but not to others. These areas define bits of information. A scintillator producing visible light which quickly fades when the exciting radiation ceases is desirable in this application to prevent a blurring of the resolution when the surface carries information at high density. The cerium and praseodymium pentaphosphate are eminently suitable for this application for this reason.

Another exemplary application of the luminescent materials of the invention is found in a radiation indicating device consisting of a cathode ray tube color system as for color television. Conventional phosphors which fluoresce in red, blue, and green are deposited on a screen in respective alternating stripes which are excited by a single cathode ray gun to produce colored light. In order to indicate the position of the cathode ray automatically, a radiation indicating scintillator emitting in the ultraviolet is arranged on the screen at regular intervals. When the scintillator is excited by the ray, it emits radiation of its own toward a detector, such as a photomultiplier, and the resulting signals are fed to a cathode ray gun modulating device. Very rapid decay of the radiation from the scintillator is necessary to permit a clear distinction between the several scintillators. Cerium and praseodymium pentaphosphates are used to good advantage for this reason. The wavelength of the radiation emitted by them is readily distinguished from the colors emitted by the stripes of fluorescent materials on the screen, and can thus be separated therefrom by filtering.

The pentaphosphate materials of the invention may also be used in infrared image converters. A photocathode at one end of a tube converts infrared radiation into an image formed by electrons. This image is transmitted to a screen at the other end of the tube through several stages in each of which the electron image is converted to electromagnetic radiation by luminescent material and back to electron form in amplified condition by an intermediate photocathode. The screen at the end of the tube which produces the ultimate visible image preferably carries pentaphosphate material of this invention as the fluorescent component.

X-Ray image amplifiers also may use such pentaphosphate materials. An X-ray signal produces a weak image on a first fluorescent screen. The light emitted by the screen is converted by a photocathode into a corresponding electron image. The emitted electrons are accelerated and are intercepted by a second fluorescent screen. Both screens are preferably provided with luminescent materials of this invention.

Yet another use for the materials of this invention is found in an infrared quantum counter. In this device, a quantum counting crystal consisting of a luminescent pentaphosphate material of the invention is exposed simultaneously to the pumping beam of a direct current laser and to the infrared beam which it is intended to analyze. When energy is absorbed from both beams, visible luminescence is generated by the crystal. One of the two beams alone does not produce luminescence. The energy of one beam may be absorbed by ions in the crystal. The second stage of energy transformation may follow either of the following modes of operation:

(a) Successive 2-Photon Excitation:

An ion activating the luminescent material is excited to a starting state either directly by adsorption of a photon from one beam or by energy transfer from a neighboring ion which may be excited otherwise by this beam or not. Internal relaxation may then occur or not. The activator ion then is excited to the luminescent state by absorption of a photon of the second beam. Light is emitted from the ion in the last-mentioned state.

(b) Excitation by Energy Transfer:

Two ions which may be equal or different metal ions and are contiguously adjacent each other absorb respective photons, the first ion from the pumping beam, the second ion from the infrared beam. Energy may then be transmitted from one ion to the other in such a manner as to excite the other ion to the luminescent state, and to cause light emission.

Because of their high metal ion concentration without concentration quenching, pentaphosphate crystals of the invention are particularly suitable for this application. The opportunity for photon absorption and energy transfer is increased to a maximum, resulting in high efficiency. The infrared beam may be modulated, for example, by interrupting it at regular, short intervals, and the output can be analyzed by known, phase responsive devices.

What is claimed is:

1. A scintillator arrangement comprising:
(a) a luminescent material which consists essentially of a pentaphosphate of the formula $XP_5O_{14}$ constituting a solid matrix, a multiplicity of luminescent sites being uniformly distributed throughout said matrix, X being an ion of at least one rare earth metal;
(b) a source of ionizing radiation applied to said material, whereby secondary radiation is emitted by said material; and
(c) means exposed to said secondary radiation for producing a perceptible signal in response to said secondary radiation.

2. An arrangement as set forth in claim 1, wherein a mixture of manganese and antimony is associated with said luminescent sites.

3. An arrangement as set forth in claim 1, wherein said matrix constitutes a single crystal.

4. An arrangement as set forth in claim 1, wherein said matrix is amorphous and glasslike.

5. An arrangement as set forth in claim 1, wherein X is cerium or praseodymium, said ionizing radiation being applied intermittently to said material.

6. An arrangement as set forth in claim 5, wherein said exposed means include a photoelectric transducer producing an electric signal in response to said secondary radiation.

7. An arrangement as set forth in claim 6, wherein X is cerium.

* * * * *